(12) United States Patent
Liu et al.

(10) Patent No.: US 12,450,492 B2
(45) Date of Patent: Oct. 21, 2025

(54) REAL-TIME PREDICTION METHOD FOR ENGINE EMISSION

(71) Applicant: Tianjin University, Tianjin (CN)

(72) Inventors: Haifeng Liu, Tianjin (CN); Xiaoteng Zhang, Tianjin (CN); Can Wang, Tianjin (CN); Mingfa Yao, Tianjin (CN)

(73) Assignee: Tianjin University, Tianjin (CN)

( * ) Notice: Subject to any disclaimer, the term of this patent is extended or adjusted under 35 U.S.C. 154(b) by 919 days.

(21) Appl. No.: 17/674,762

(22) Filed: Feb. 17, 2022

(65) Prior Publication Data

US 2022/0261655 A1 Aug. 18, 2022

(30) Foreign Application Priority Data

Feb. 18, 2021 (CN) .......................... 202110190224.3

(51) Int. Cl.
G06N 3/086 (2023.01)
G01M 15/10 (2006.01)
G06F 18/214 (2023.01)
G06N 3/045 (2023.01)

(52) U.S. Cl.
CPC .......... G06N 3/086 (2013.01); G01M 15/102 (2013.01); G06F 18/214 (2023.01); G06N 3/045 (2023.01)

(58) Field of Classification Search
CPC ..... G06N 3/086; G06N 3/045; G01M 15/102; G01M 15/05; G06F 18/214; G06F 18/24133; G06F 30/27; G06F 2111/10
See application file for complete search history.

(56) References Cited

U.S. PATENT DOCUMENTS

| | | | |
|---|---|---|---|
| 11,035,281 B2* | 6/2021 | Srinivasan | F01N 11/002 |
| 11,149,677 B1* | 10/2021 | Charbonnel | F02D 41/0087 |
| 2007/0174222 A1* | 7/2007 | Daneau | G05B 13/04 706/19 |
| 2015/0088398 A1* | 3/2015 | Cui | F02D 41/2432 701/101 |
| 2015/0308321 A1* | 10/2015 | Zhang | F01N 3/208 701/101 |
| 2019/0025158 A1* | 1/2019 | Tasik | G01M 15/102 |

FOREIGN PATENT DOCUMENTS

CN 112241609 A * 1/2021

OTHER PUBLICATIONS

Yang, G. R., & Wang, X. J. (2020). Artificial neural networks for neuroscientists: a primer. Neuron, 107(6), 1048-1070. (Year: 2020).*

* cited by examiner

Primary Examiner — James T Tsai
(74) Attorney, Agent, or Firm — Fish IP Law, LLP

(57) ABSTRACT

A real-time prediction method for an engine emission is provided, including: acquiring multiple known historical test data samples for engine emission, dividing the samples into a training set and a test set to train multiple neural network (NN), calculating mean square errors (MSEs) output by each of the NNs with the different numbers of hidden layer nodes to determine a topological structure of the NNs, optimizing initial weights and initial thresholds for each of the NNs with a mind evolutionary algorithm (MEA), and establishing a real-time engine emission prediction system with an Adaboost algorithm.

6 Claims, 10 Drawing Sheets

REAL-TIME PREDICTION METHOD FOR ENGINE EMISSION

CROSS REFERENCE TO RELATED APPLICATIONS

This patent application claims the benefit and priority of Chinese Patent Application No. 202110190224.3 filed on Feb. 18, 2021, the disclosure of which is incorporated by reference herein in its entirety as part of the present application.

TECHNICAL FIELD

The present disclosure relates to the exhaust emission detection of engines, and in particular, to a real-time prediction method for an engine emission.

BACKGROUND ART

There have been two methods for acquiring emission data of the engine, one of which is to simulate an in-cylinder combustion process of the engine through computational fluid dynamics (CFD) software, and the other is to measure engine emissions through instruments such as the gas analyzer in bench test of the engine. However, the above two methods are defective to some extent. The first method involves simulation on complicated physical and chemical reactions during combustion of the engine and establishment of detailed three-dimensional (3D) grid models for the engine. The accuracy of the simulated result of engine emission is greatly dominated by the density and quality of the grids of the 3D grid models, and the first method is time-consuming in calculation. Considering that the instruments such as the gas analyzer are greatly affected by environmental factors, the second method cannot desirably reflect performance of transient emission of the engine, and in most cases, only provides accurate values of engine emission within a limited range; and in actual use, the method typically involves the establishment of a complete set of supporting devices, and the expensive purchase and maintenance cost of associated instruments.

SUMMARY

An object of the present disclosure is to provide a simple and reliable real-time prediction method for an engine emission, to overcome the shortages of the prior art.

The technical solutions adopted by the present disclosure to solve the above technical problems are as follows.

A real-time prediction method for an engine emission includes the following steps.

In step 1, multiple known historical test data samples for engine emission are acquired, the historical test data samples each including values of various evaluation indexes affecting the engine emission and an emission value of an engine in a working condition.

In step 2, the multiple known historical test data samples are randomly divided into a training set and a test set.

In step 3, a topological structure of each of multiple neural network (NN) predictive models is determined. The process specifically includes the following steps.

In step 31, values of various evaluation indexes affecting the engine emission in the training set for the historical test data samples are determined as an input of each of NNs, and an emission value of the engine in the working condition in the training set for the historical test data samples are determined as an output of each of the NNs, a number of input layer nodes and a number of output layer nodes in the NN are determined according to input and output dimensions, and learning and training are performed on the multiple NN predictive models with different numbers of hidden layer nodes;

in step 32, multiple NN predictive models with the different numbers of hidden layer nodes are obtained upon completion of the training on the NN predictive models, and values of various evaluation index affecting the engine emission in the test set for the historical test data samples are respectively calculated as an input of each of the NNs, mean square errors (MSEs) between predicted values of the NNs with the different numbers of hidden layer nodes and theoretical values; and in step 33, a number of hidden layer nodes corresponding to a minimum MSE of the MSEs between the predicted values and the theoretical values of the NN predictive models are set as an optimal number of hidden layer nodes, and a number of hidden layer nodes in each of rest NN predictive models are set as the optimal number of hidden layer nodes.

In step 4, a mind evolutionary algorithm (MEA), initial weights and initial thresholds for each of the multiple NN predictive models with identical topological structure obtained in step 3 are optimized.

In step 5, optimal initial weights and optimal initial thresholds obtained with the MEA for each of the multiple NN predictive models with identical topological structure are set as the initial weights and the initial thresholds for each of the multiple NN predictive models with identical topological structure. Learning and training are performed on each of the NN predictive models with the training set for the historical test data samples through an Adaboost algorithm, to obtain multiple weak NN predictors. The multiple weak NN predictors are combined into a strong NN predictor model.

In step 6, in real time, values of various evaluation indexes affecting the engine emission is acquired, and is loaded to the strong NN predictor model to obtain a real-time predicted result for the engine emission.

The present disclosure has the following beneficial effects.

1. The present disclosure optimizes the initial weights and the initial thresholds of the NNs with the MEA, preventing the locally optimal solution and the like arising from a slow early learning rate of the NN. With convergence and mutation operations that are coordinated with each other and are independent appropriately, the present disclosure improves the operating efficiency of the algorithm, prevents the problem that the conventional genetic algorithm destroys desirable genes due to crossover and mutation operations, and improves the algorithm performance of the NN.

2. The present disclosure establishes the strong NN predictor models with the Adaboost algorithm, preventing the limited generalization of the single NN.

3. The present disclosure neither performs simulation and grid design on the complicated physical and chemical reactions like the conventional test method in use, nor purchases the expensive instruments such as the gas analyzer. Only by simply measuring a rotation speed, a torque, a power, a rail pressure, an air-fuel ratio, a fuel consumption, an exhaust gas recirculation (EGR) rate, and a start of injection (SOI) of the engine in operation, the present disclosure can provide the transient nitrogen oxide (NOx) emission, total hydro carbon (THC) emission and carbon monoxide (CO) emission of the engine accurately in real time; and moreover, With the powerful learning capacity of the NN, when the number of training sample data is increased, the present disclosure can obtain a more accurate predicted result to better reflect the actual condition, and thus can be applied to measuring the transient emissions of any engine in various cases.

DETAILED DESCRIPTION OF THE EMBODIMENTS

Figure 1:
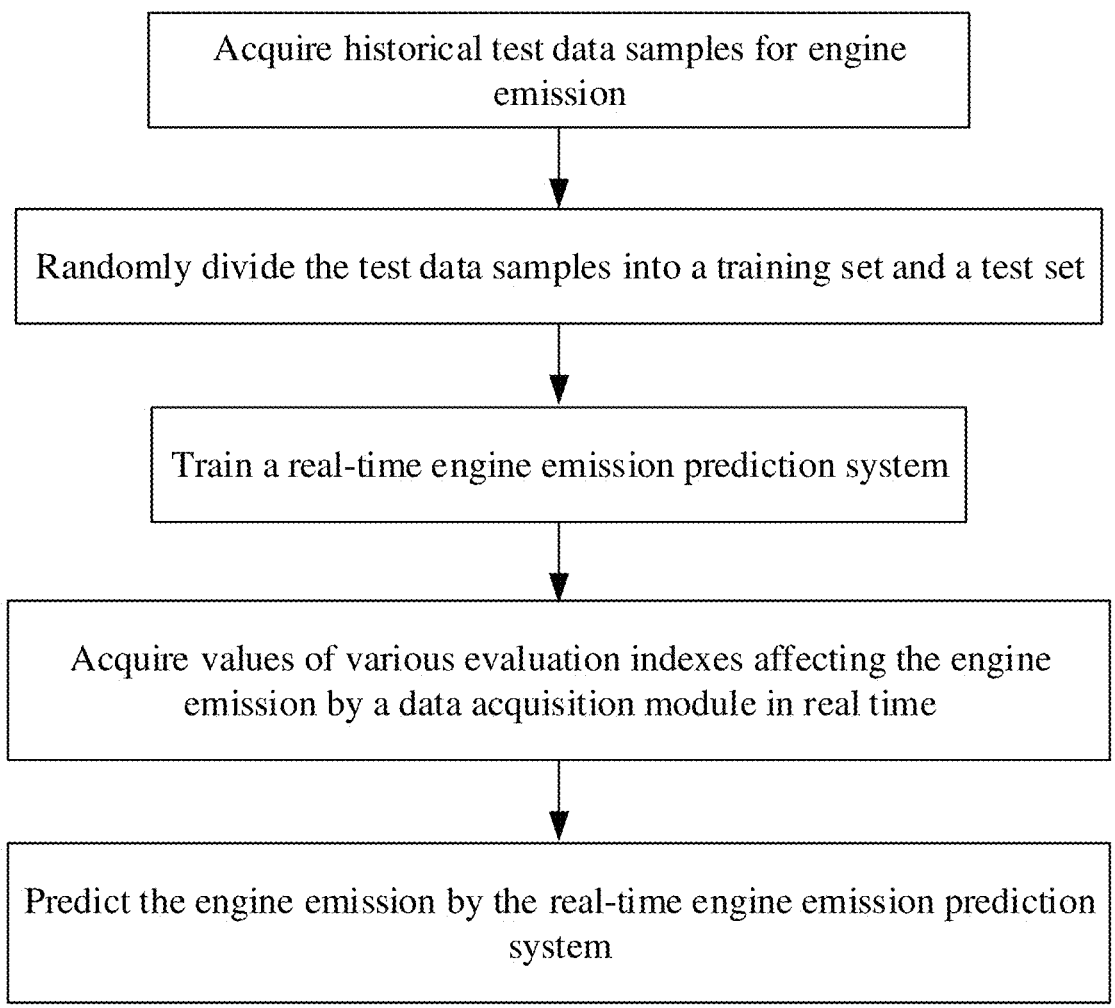
FIG. 1 is an overall flowchart of a real-time prediction method for an engine emission according to the present disclosure.
Figure 2:
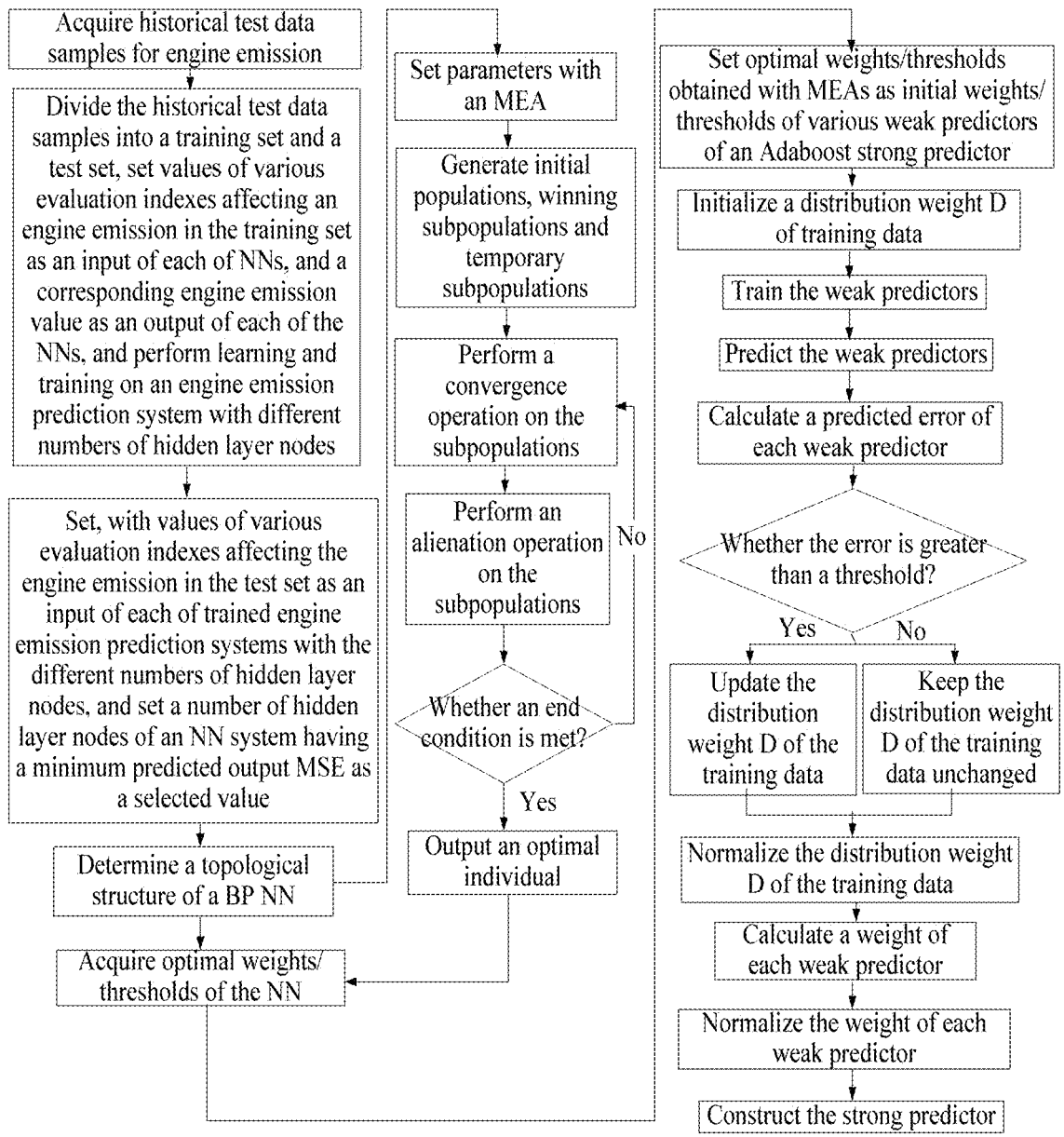
FIG. 2 is a schematic diagram illustrating training process of the real-time prediction method for an engine emission according to the present disclosure.
Figure 3:
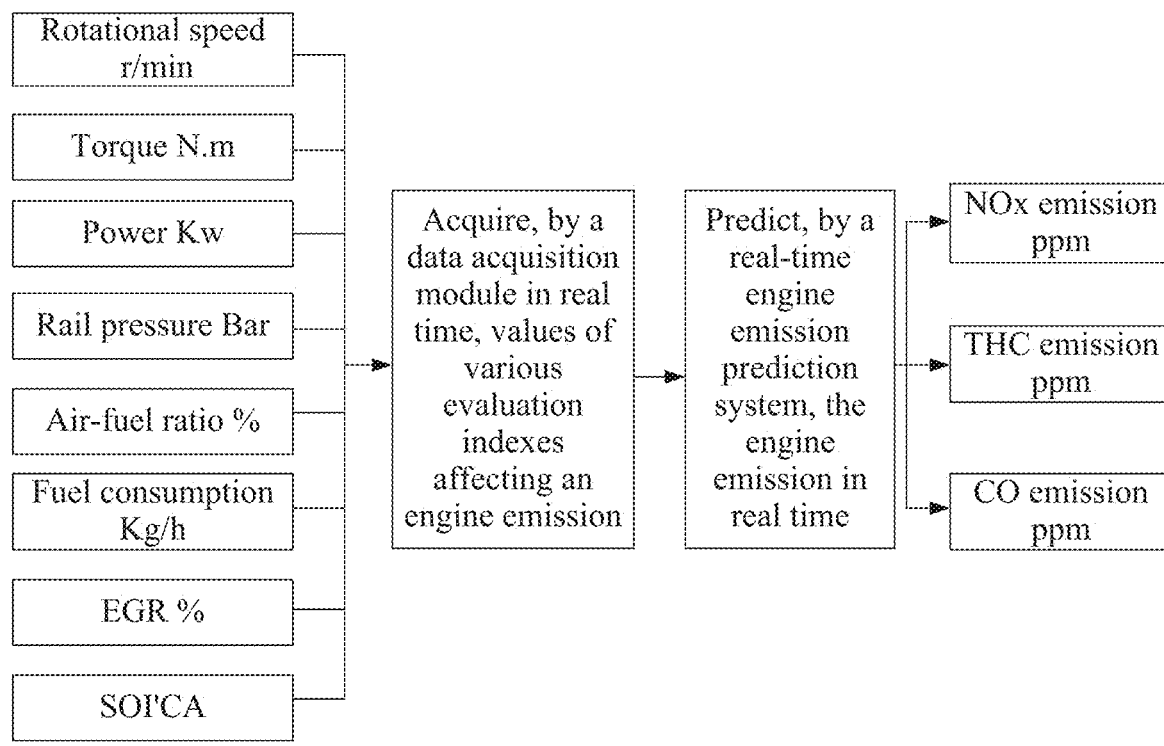
FIG. 3 is a schematic diagram illustrating working process of the real-time prediction method for an engine emission according to the present disclosure.

The technical solutions in embodiments of the present disclosure will be described below clearly and completely with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skills in the art without creative work shall fall within the protection scope of the present disclosure.

Referring to FIGS. 1 to 10, the present disclosure provides a real-time prediction method for an engine emission, including the following steps.

In step 1, multiple known historical test data samples for engine emission are acquired. The historical test data samples each including values of various evaluation indexes affecting the engine emission and a value of an engine emission in the working condition. Various evaluation indexes affecting the engine emission include a rotational speed, a torque, a power, a rail pressure, an air-fuel ratio, a fuel consumption, an EGR rate and an SOI. The emission value of the engine in the working condition includes a NOx emission value, a THC emission value and a CO emission value.

In step 2, the multiple known historical test data samples are randomly divided into a training set and a test set to embody a generalization ability of a model. As an implementation of the present disclosure, the training set includes 90% of samples, while the test set includes 10% of samples.

In step 3, a topological structure of each of NN predictive models is determined, the process specifically includes the following steps.

In step 31, a value of each evaluation index affecting the engine emission in the training set from the historical test data samples is determined as an input of an NN, and a value of the engine emission in the working condition in the training set from the historical test data samples is determined as an output of the NN. A number of input layer nodes and a number of output layer nodes in the NN are determined according to input and output dimensions, and then multiple NN predictive models with different numbers of hidden layer nodes are learned and trained. As an implementation of the present disclosure, there are 8 input layer nodes, 3 output layer nodes, and 2-70 hidden layer nodes that are increased by 2 nodes for each training. The training steps are specifically as follows.

In step 301, min-max normalization is performed on an input k and an output l of each sample i in the training set from the historical test data samples of engine emission according to equations:

$$x_k^i = \frac{x_k^i - x_{k\,min}}{x_{k\,max} - x_{k\,min}} \qquad (3\text{-}1)$$

$$i = 1, 2, \ldots, m; k = 1, 2, \ldots, p$$

$$y_l^i = \frac{y_l^i - y_{l\,min}}{y_{l\,max} - y_{l\,min}} \quad (3\text{-}2)$$

$$i = 1, 2, \ldots, m; l = 1, 2, \ldots, h$$

where, m represents a total number of samples in the training set, p represents the number of input layer nodes, h represents the number of output layer nodes, $x_k^i$ represents a kth input of an ith sample in the training set, $x_{kmax}$ represents a maximum value among kth inputs of all samples in the training set, $x_{kmin}$ represents a minimum value among the kth inputs of all samples in the training set, $y_l^i$ represents an lth output of the ith sample in the training set, $y_{lmax}$ represents a maximum value among lth outputs in all samples in the training set, and $y_{lmin}$ represents a minimum value among the lth outputs in all samples in the training set.

In step 302, a connection weight $w_{ks}$ between a kth neuron in the input layer and a sth neuron in the hidden layers, a threshold $a_s$ of the sth neuron in the hidden layer, a connection weight $w_{sl}$ between the sth hidden layer neuron and an lth output layer neuron, and a threshold $b_l$ of the lth neuron in the output layer are initialized.

In step 303, an output from a hidden layer for each sample i in the training set is calculated according to an equation:

$$H_s^{i0} = f\left(\sum_{k=1}^{p} x_k^j w_{kz} + a_z\right) \quad (3\text{-}3)$$

$$i = 1, 2, \ldots, m; s = 1, 2, \ldots, g$$

where, $H_s^i$ represents an output from an sth hidden layer neuron for the ith sample, g is the number of hidden layer nodes, and f is an activation function for the hidden layer neuron, which adopts a single-curve tangent sigmoid function expressed as:

$$f(t) = \frac{1}{1 + e^{-t}}. \quad (3\text{-}4)$$

In step 304, an output $O_l^i$ from an output layer for each sample i in the training set is calculated according to an equation:

$$O_l^i = M\left(\sum_{s=1}^{g} H_s^i w_{sl} + b_l\right) \quad (3\text{-}5)$$

$$i = 1, 2, \ldots, m; l = 1, 2, \ldots, h$$

where, $O_l^i$ represents an output from an lth output layer neuron for the ith sample, and M is an activation function for the output layer neuron, which adopts a linear function expressed as:

$$M(t)=t \quad (3\text{-}6)$$

In step 305, an output error of the NN is calculated according to an equation:

$$E = \frac{1}{2}\sum_{i=1}^{m}\sum_{l=1}^{h}\left(y_l^i - O_l^i\right)^2. \quad (3\text{-}7)$$

In step 306, with a gradient descent method, the connection weight $w_{ks}$ between the kth input layer neuron and the sth hidden layer neuron, and the connection weight $w_{sl}$ between the sth hidden layer neuron and the lth output layer neuron are updated.

Specifically, a variation $\Delta w_{ks}$ for the connection weight between the kth input layer neuron and the sth hidden layer neuron is expressed as:

$$\Delta w_{ks} = -\eta\frac{\partial E}{\partial w_{ks}} = \eta\sum_{i=1}^{m} x_k^i H_s^i(1 - H_s^i)\sum_{l=1}^{h} w_{sl}\left(y_l^i - O_l^i\right) \quad (3\text{-}8)$$

$$k = 1, 2, \ldots, p; s = 1, 2, \ldots, g$$

where, η is a preset learning rate which is a default value and is set to 0.01 in the embodiment.

An updated connection weight $w_{ks}$ between the kth input layer neuron and the sth hidden layer neuron is expressed as:

$$\omega_{ks}=w_{ks}+\Delta w_{ks} k=1,2,\ldots,p; s=1,2,\ldots,g \quad (3\text{-}9)$$

A variation $\Delta w_{sl}$ for the connection weight between the sth hidden layer neuron and the lth output layer neuron is expressed as:

$$\Delta w_{sl} = -\eta\frac{\partial E}{\partial w_{sl}} = \eta\sum_{i=1}^{m} H_s^i\left(y_l^i - O_l^i\right) \quad (3\text{-}10)$$

$$S = 1, 2, \ldots, g; l = 1, 2, \ldots, h.$$

An updated connection weight $w_{sl}$ between the sth hidden layer neuron and the lth output layer neuron is expressed as:

$$w_{sl}=w_{sl}+\Delta w_{sl} s=1,2,\ldots,g; l=1,2,\ldots,h. \quad (3\text{-}11)$$

In step 307, with the gradient descent method, the threshold as of the sth hidden layer neuron and the threshold $b_l$ of the lth output layer neuron are updated.

Specifically, a variation $\Delta a_s$ for the threshold of the sth hidden layer neuron is expressed as:

$$\Delta a_z = -\eta\frac{\partial E}{\partial a_z} = \eta\sum_{i=1}^{m} H_s^i(1 - H_s^i)\sum_{l=1}^{h} w_{sl}\left(y_l^i - O_l^i\right) \quad (3\text{-}12)$$

$$S = 1, 2, \ldots, g.$$

An updated threshold $a_s$ of the sth hidden layer neuron is expressed as:

$$a_s=a_s+\Delta a_s s=1,2,\ldots,g. \quad (3\text{-}13)$$

A variation $\Delta b_l$ for the threshold of the lth output layer neuron is expressed as:

$$\Delta b_l = -\eta\frac{\partial E}{\partial b_l} = \eta\sum_{i=1}^{m}\left(y_l^i - O_l^i\right) \quad (3\text{-}14)$$

$$L = 1, 2, \ldots, h.$$

An updated threshold $b_l$ of the lth output layer neuron is expressed as:

$$b_l=b_l+\Delta b_l \ l=1,2,\ldots,h. \quad (3\text{-}15)$$

In step 308, it is determined whether iterations are ended, and if the iterations are not ended, steps 303-307 are repeated. The number of iterations is set as 1,000 in the embodiment.

In step 32, multiple NN predictive models of different numbers of hidden layer nodes are obtained upon completion of the training on the NN predictive model, and with an MSE for evaluating a model accuracy, and values of various evaluation indexes affecting the engine emission in the test set in the historical test data samples are calculated as an input of the NN, MSEs between NN predicted values and theoretical values under the different numbers of hidden layer nodes according to equation (3-16):

$$MSE = \frac{1}{n}\sum_{j=1}^{n}\sum_{l=1}^{h}(Y_l^j - O_l'^j)^2 \qquad (3\text{-}16)$$

where, n is a total number of samples in the test set, h represents the number of output layer nodes; $Y_l^j$ is a theoretical value of an lth output of a jth sample in the test set before the normalization; $O_l'^j$ is a predicted value of the lth output $O_l^j$ predicted by the NN for the jth sample in the test set, after reverse normalization; the reverse normalization is expressed as equation (3-17):

$$O_l'^j = O_l^j \times (y_{lmax} - y_{lmin}) + y_{lmin}\ j=1,2,\ldots,n; l=1,2,\ldots,h \qquad (3\text{-}17)$$

where, $y_{lmax}$ represents the maximum value among the lth outputs for all samples in the training set; and $y_{lmin}$ represents the minimum value among the lth outputs for all samples in the training set.

In step 33, a number of hidden layer nodes corresponding to a minimum one of the MSEs between the predicted values of a NN predictive model and theoretical values are set as an optimal number of hidden layer nodes, and a number of hidden layer nodes in each of rest NN predictive models are set as the optimal number of hidden layer nodes.

Figure 4:
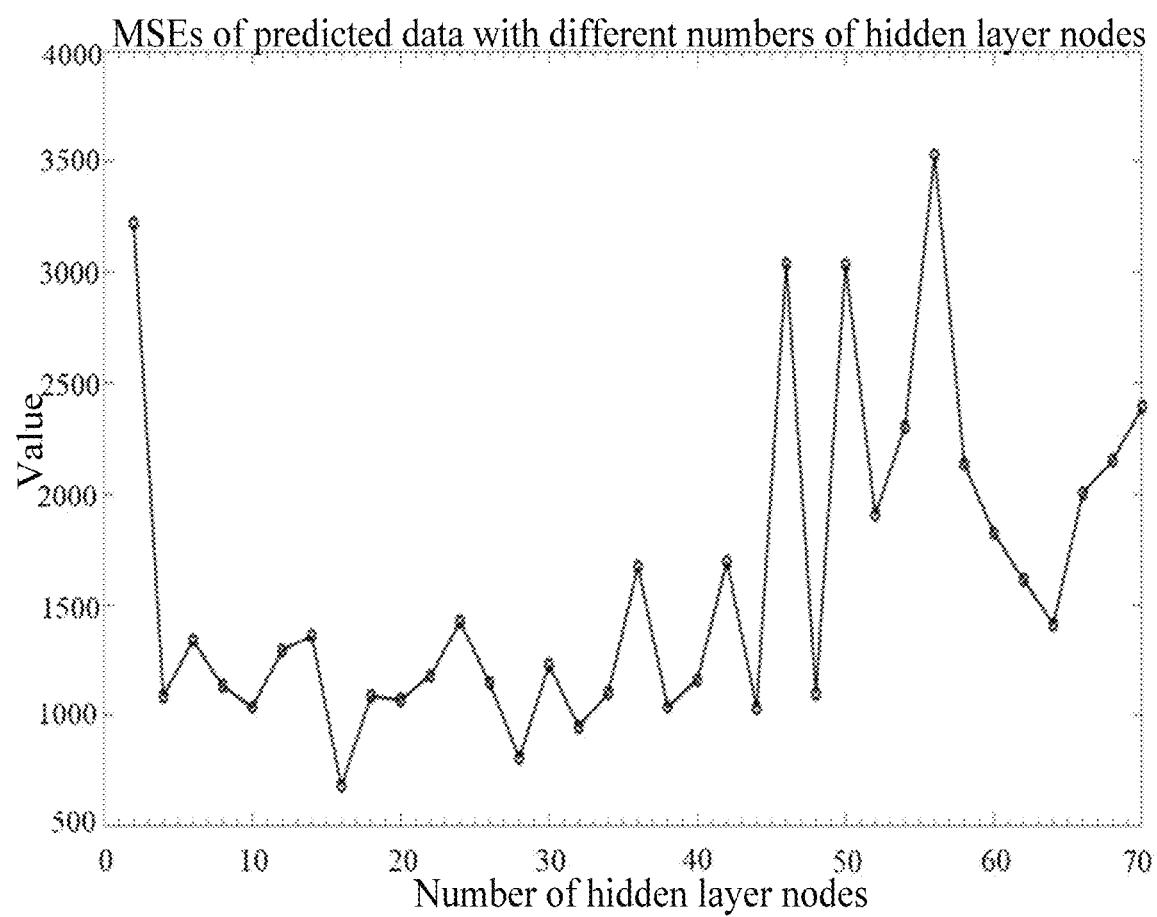
FIG. 4 is a schematic diagram illustrating MSEs of predicted data under different numbers of hidden layer nodes in step 3 according to the method of the present disclosure.

As an implementation of the present disclosure, upon the completion of the calculation, the schematic diagram illustrating the MSEs between the predicted values of the NNs and the theoretical values under the different numbers of hidden layer nodes is as shown in FIG. 4. As can be seen, there is the minimum MSE between the predicted value of the NN and the theoretical value when the number of hidden layer nodes is 16, and thus the number of hidden layer nodes of the NN in the following steps is set as 16.

For a common NN model, the number of hidden layer nodes is typically set as the default 20. For ease of better reflecting the actual problem in the step, the better number of hidden layer nodes is favorable to improve the accuracy of the final model overall.

In step 4, with an MEA, an initial weight and an initial threshold of each of multiple NN predictive models with identical topological structure obtained in step 3 are optimized, the process specifically includes the following steps.

In step 401, operating parameters of the MEA are set with Matlab software, the operating parameters including the topological structure, an encoding mode, a number of iterations, a population size, winning subpopulations and temporary subpopulations of each of the NN predictive models.

In the present disclosure, the topological structure of each of the NN predictive models is determined in step 3, the number of iterations is 100, the population size is 600, the number q of winning subpopulations and the number z of temporary subpopulations are 10, and each subpopulation includes 30 individuals. An encoding mode for each of individuals is real-number encoding, and an encoding length t is expressed as:

$$t = pg + gh + g + h \qquad (4\text{-}1)$$

where, p is a number of input layer nodes in each of the NN predictive models, g is a number of hidden layer nodes in each of the NN predictive models, and h is a number of output layer nodes in each of the NN predictive models. In the present disclosure, p, g and h are set to be p=8, g=16, and h=3.

In step 402, the winning subpopulations and the temporary subpopulations are randomly generated, a convergence operation is performed on each of the winning subpopulations and the temporary subpopulations until the winning subpopulations and the temporary subpopulations are mature, namely the convergence operation cannot be stopped until an individual having a higher score is no longer generated, and an optimal individual in each of the winning subpopulations and the temporary subpopulations is set as a score of the subpopulation.

As an implementation of the present disclosure, the specific steps are as follows.

In step 4021, a score function for individuals in each of the winning subpopulations and the temporary subpopulations are defined, the process specifically includes the following steps.

Each individual in the winning subpopulations and the temporary subpopulations are decoded to obtain an NN connection weight matrix and an NN threshold matrix corresponding to each individual.

Specifically, a first element to a (p*g)th element of the individual in each of the subpopulations are transformed into a first connection weight matrix $w_{p \times g}$ in a column order, namely, a first column is fully stored and then other columns are fully stored in sequence, various elements in the first connection weight matrix are consistent with the connection weights $w_{ks}$ from the input layer neurons to the hidden layer neurons in step 3. A (p*g+1)th element to a (p*g+g*h)th element of the individual are transformed into a second connection weight matrix $w_{g \times h}$ according to the column order, various elements in the second connection weight matrix are consistent with the connection weights $w_{sl}$ from the hidden layer neurons to the output layer neurons in step 3, A (p*g+g*h+1)th element to a (p*g+g*h+g)th element of the individual are transformed into a first threshold matrix $w_{g \times 1}$ according to a column order, various element in the first threshold matrix are consistent with the thresholds $a_s$ of the hidden layer neurons in step 3. A (p*g+g*h+g+1)th element to a (p*g+g*h+g+h)th element are transformed into a second threshold matrix $w_{h \times 1}$ according to the column order, various elements in the second threshold matrix are consistent with the thresholds $b_l$ of the output layer neurons in step 3.

Upon completion of the individual decoding, with the values of various evaluation indexes affecting the engine emission in the training set from the historical test data samples as the input of each of the NN predictive models, and the emission value of the engine in the working condition in the training set from the historical test data samples as the output of each of the NN predictive models, an output of each of the NN predictive models is calculated according to equations (3-1)-(3-6), an MSE output by each of the NN predictive models is calculated according to an MSE calculation equation shown in equation (4-3), and a reciprocal of the MSE is deemed as a score val of the individual according to an equation:

$$val = \frac{1}{MSE} \quad (4-2)$$

$$MSE = \frac{1}{m}\sum_{i=1}^{z}\sum_{l=1}^{h}(y_l'^z - O_l'''^i)^2 \quad (4-3)$$

where, m is a total number of samples in the training set, h represents a number of output layer nodes, $y''^i_l$ is a theoretical value of the lth output for the ith sample in the training set before the normalization, and $O'''^i_l$ is a predicted value of the lth output $O_l^i$ calculated according to equations (3-1)-(3-6) for the jth sample in the training set, after the reverse normalization.

In step 4022, q+z individuals within a global range are randomly generated, where q is a number of winning subpopulations, and z is a number of temporary subpopulations. Scores of the individuals are calculated according to equation (4-2), the individuals are sorted according to the scores in the decreasing order to sequentially set front q individuals as centers of the q winning subpopulations and rear z individuals as centers of the z temporary subpopulations. New individuals are generated according to a normal distribution rule based on a center of each of the winning subpopulations and the temporary subpopulations to form initial winning subpopulations and an initial temporary subpopulations.

In step 4023, a convergence operation is performed on each of the initial winning subpopulations and the initial temporary subpopulations, the process specifically includes: calculating scores of all individuals in each of the initial winning subpopulations and the initial temporary subpopulations; and determining whether an initial winning subpopulation or an initial temporary subpopulation includes an individual having a score greater than a score of a center of the subpopulation; setting the individual as a new center of the subpopulation, and generating new individuals based on the new center according to the normal distribution rule to form a new subpopulation; repeating the above operations until an individual having a score greater than the score of the center of the subpopulation is no longer generated in the subpopulation, which means the subpopulation is mature, and the score at the center of the subpopulation is set as the score of the subpopulation.

In step 403, an mutation operation between the winning subpopulations and the temporary subpopulations is performed upon completion of the convergence operation, and then step 404 is executed. The mutation operation between the winning subpopulations and the temporary subpopulations includes: replacing, if a temporary subpopulation has a score greater than a score of a winning subpopulation, the winning subpopulation with the winning temporary subpopulation to form a new winning subpopulation; releasing individuals in the original winning subpopulation, and performing a global research again to form a new temporary subpopulation to supplement the number of temporary subpopulations; releasing, if a temporary subpopulation has a score less than a score of any winning subpopulation, individuals in the temporary subpopulation, and performing the global search again to form a new temporary subpopulation; and not performing any operation if a temporary subpopulation has a score same as a score of any winning subpopulation.

In step 404, according to the method in step 4023, the convergence operation is performed on the new temporary subpopulation and the new winning subpopulation obtained in step 403, step 403 is repeated till the end of iterations Then, a globally optimal individual is calculated, and the individual is decoded to obtain the optimal initial weights and the optimal initial thresholds for each of the NN predictive models.

In step 5, with an Adaboost algorithm, the optimal initial weights and the optimal initial thresholds obtained with the MEA for each of the multiple NN predictive models with identical topological structure are set as the initial weights and the initial thresholds for each of the multiple NN predictive models with identical topological structure. Each of the NN predictive models is learned and trained with the training set from the historical test data samples of the engine emission to obtain multiple weak NN predictors, and the multiple weak NN predictors are combined into a strong NN predictor model. The process specifically includes the following steps.

In step 501, a distribution weight of each sample i in a training set is initialized for each of the weak NN predictors according to an equation:

$$D_t(i) = 1/m \quad t=1,2,\ldots,v; \; i=1,2,\ldots,m \quad (5-1)$$

where, v is a total number of the weak NN predictors and is 40 in the embodiment, and m is a total number of samples in the training set.

In step 502, a tth weak NN predictor is trained according to the NN training step in step 3, and an output error e' of each sample i in the training set is calculated according to an equation:

$$e_t^i = \sum_{l=1}^{h}(y_{tl}^i - O_{tl}^i) \quad (5-2)$$

$$t = 1, 2, \ldots, v; \; i = 1, \ldots, m$$

where, $y_{tl}^i$ represents a theoretical value for an lth output of the tth weak NN predictor for an ith sample, $O_{tl}^i$ represents a predicted value for the lth output of the tth weak NN predictor for the ith sample, and h represents a total number of output variables and is 3 in the embodiment.

In step 503, a distribution weight of each sample i in a training set of a (t+1)th weak NN predictor is updated. The distribution weight of each sample in the training set of the (t+1)th weak NN predictor is updated according to equation (5-3) if the output error $e_t^i$ of each sample i in the training set of the tth weak NN predictor is greater than a preset threshold c. The distribution weight of the sample is kept unchanged if the output error $e_t^i$ of each sample i in the training set of the tth weak NN predictor is less than or equal to the set threshold c. and the distribution weight of each sample i is normalized according to equation (5-4), the threshold c is 0.4 in the embodiment.

$$D_{t+1}(i) = 1.32 * D_t(i) \quad (5-3)$$

$$D_{t+1}(i) = D_{t-1}(i)/\sum_{i=1}^{m}D_{t+1}(i). \quad (5-4)$$

In step 504, a distribution weight $a_t$ of the tth weak NN predictor is calculated according to an equation:

$$a_t = \frac{1}{2}\ln\left(\frac{1-e_t}{e_t}\right) \quad T = 1, 2, \ldots, v \quad (5-5)$$

where, v is the total number of the weak NN predictors, $$e_t = \sum_{i=1}^{m} B_t(i), \text{ and } B_t = \begin{cases} D_t(i), \text{ when } ee_t^i > c \\ 0, \text{ when } e_t^i \leq c \end{cases}.$$

In step 505, steps 502-504 are repeated until t weak NN predictors are completely trained.

In step 506, the strong NN predictor is established according to the following steps.

The distribution weight of each of the weak NN predictors is normalized according to equation (5-6), and the weak NN predictors are combined according to equation (5-7) to form the strong NN predictor model.

$$a_t = a_t / \sum_{t=1}^{v} a_t \quad (5\text{-}6)$$

$$output_j = \sum_{t=1}^{v} a_t Y_t^j \quad (5\text{-}7)$$

where, $a_t$ is the distribution weight of the tth weak NN predictor, output j represents a predicted output of the strong NN predictor for a jth sample in a dataset to be predicted, $Y_t^j$ represents a predicted output of a tth trained weak NN predictor for the jth sample in the dataset to be predicted, j=1, 2, . . . , n, and n is a total number of samples in the dataset to be predicted.

In step 6, in real time, the value of each evaluation index affecting the engine emission is acquired, and the value is loaded to the strong NN predictor model to obtain a real-time predicted result for the engine emission.

Further, the emission value of the engine in step 1 is analyzed and obtained by a gas analyzer; and the value of each evaluation index affecting the engine emission in steps 1 and 6 is acquired by a data acquisition module.

EMBODIMENT 100 historical test data samples for the engine emission are selected, 90 samples are randomly selected therefrom to train the predictive model used in the real-time prediction method for an engine emission provided by the present disclosure, and remaining 10 samples are used as a test set to check the accuracy of the model after training, thereby drawing the following conclusions.

Figure 5:
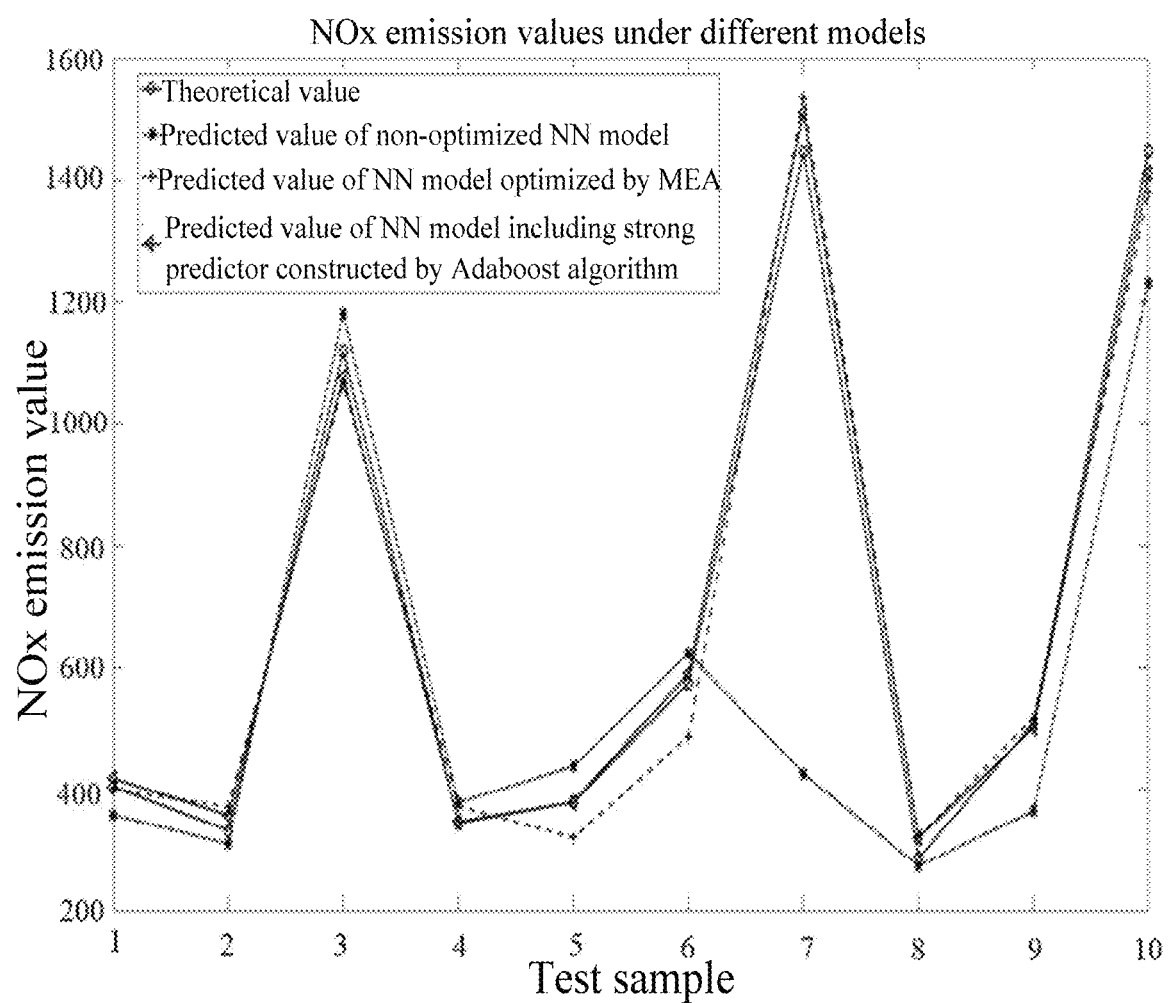
FIG. 5 is a comparison diagram among the real-time prediction method for an engine emission which is implemented by optimizing an initial weight and an initial weight of an NN with an MEA and establishing a strong NN predictor with an Adaboost algorithm, a non-optimized NN, and an NN only having an initial weight and an initial threshold optimized, in terms of an NOx emission predicted effect according to the present disclosure.

1. The comparison diagram among the real-time prediction method for an engine emission provided by the present disclosure, the non-optimized NN and the NN only having the initial weight and threshold optimized in terms of the NOx emission predicted effect is as shown in FIG. 5.

Figure 6:
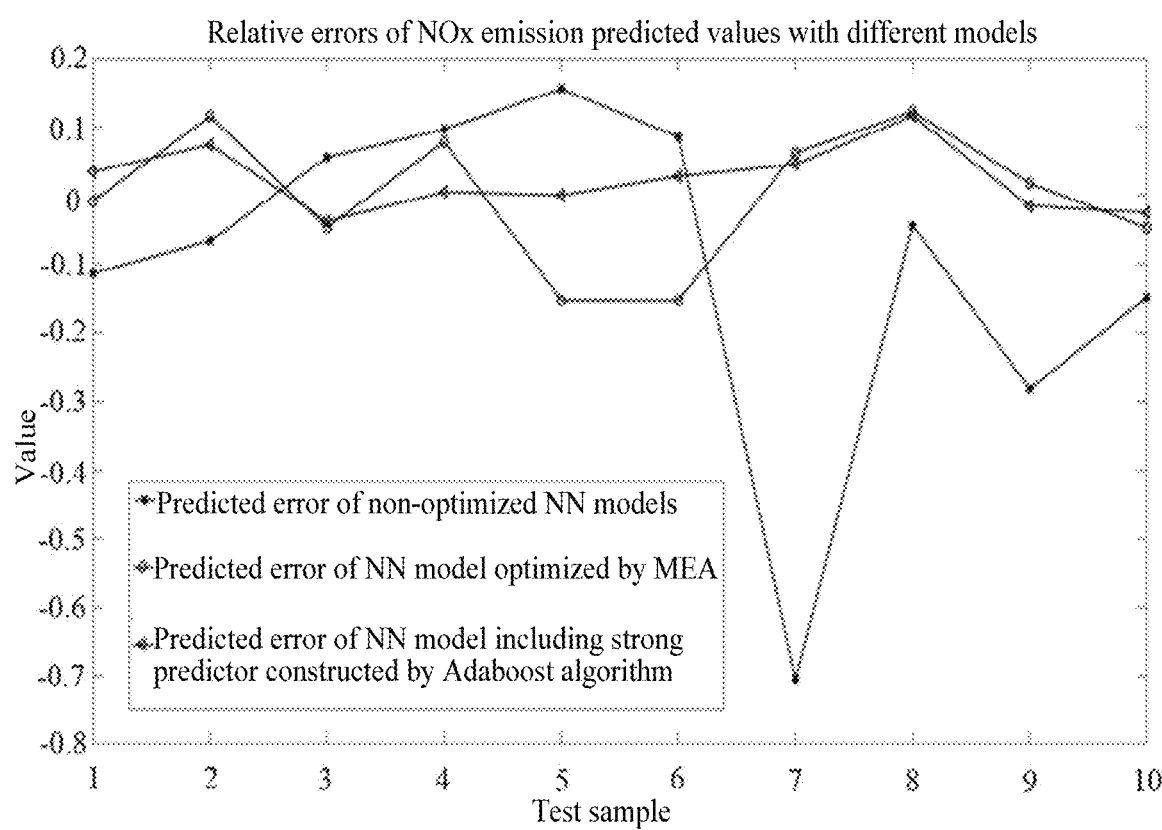
FIG. 6 is a comparison diagram among the real-time prediction method for an engine emission which is implemented by optimizing an initial weight and an initial weight of an NN with an MEA and establishing a strong NN predictor with an Adaboost algorithm, a non-optimized NN, and an NN only having an initial weight and an initial threshold optimized, in terms of a relative error of an NOx emission predicted value according to the present disclosure.

2. The comparison diagram among the real-time prediction method for an engine emission provided by the present disclosure, the non-optimized NN and the NN only having the initial weight and threshold optimized in terms of the relative error of the NOx emission predicted value is as shown in FIG. 6.

Figure 7:
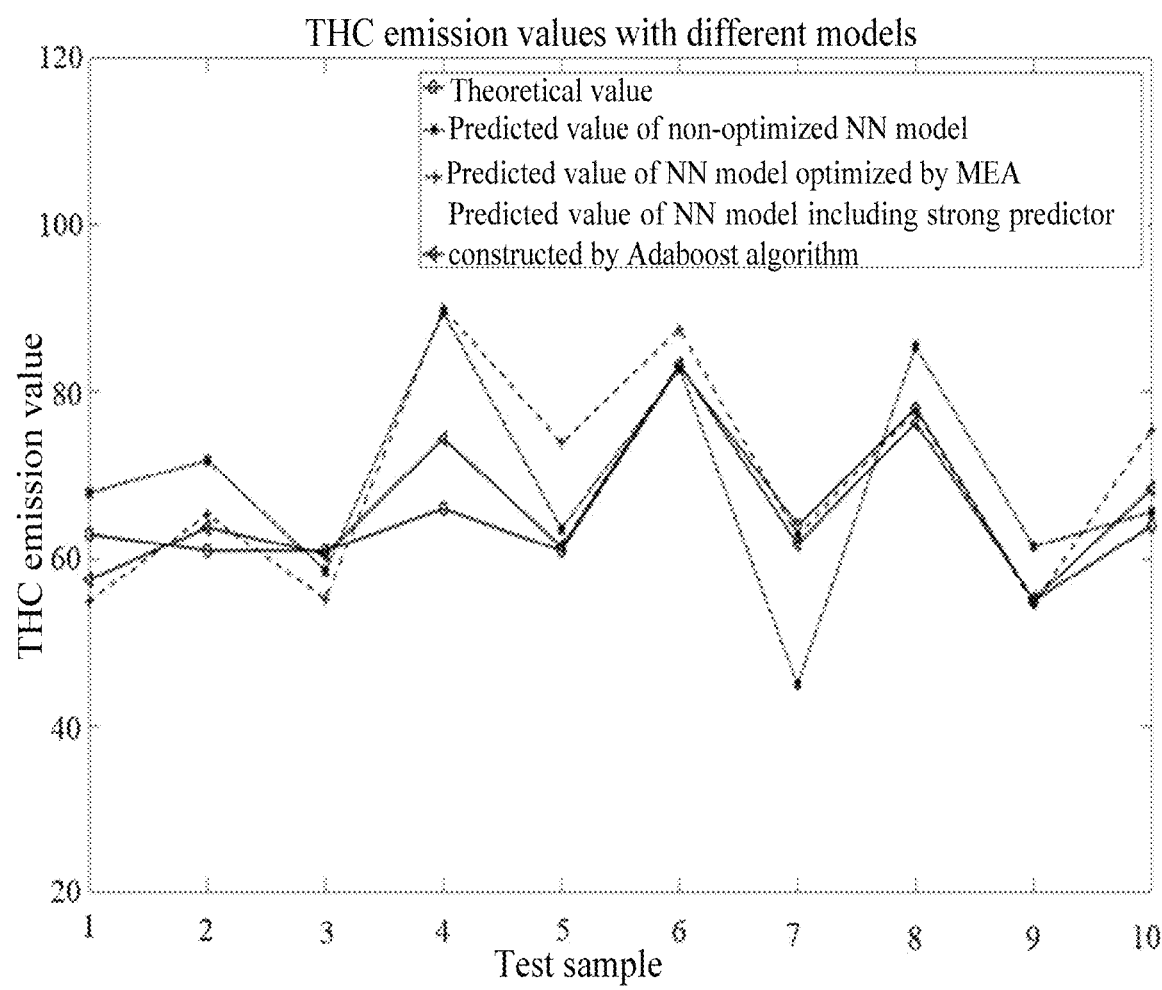
FIG. 7 is a comparison diagram among a real-time prediction method for an engine emission which is implemented by optimizing an initial weight and an initial weight of an NN with an MEA and establishing a strong NN predictor with an Adaboost algorithm, a non-optimized NN, and an NN only having an initial weight and an initial threshold optimized, in terms of a THC emission predicted effect according to the present disclosure.

3. The comparison diagram among the real-time prediction method for an engine emission provided by the present disclosure, the non-optimized NN and the NN only having the initial weight and threshold optimized in terms of the THC emission predicted effect is as shown in FIG. 7.

Figure 8:
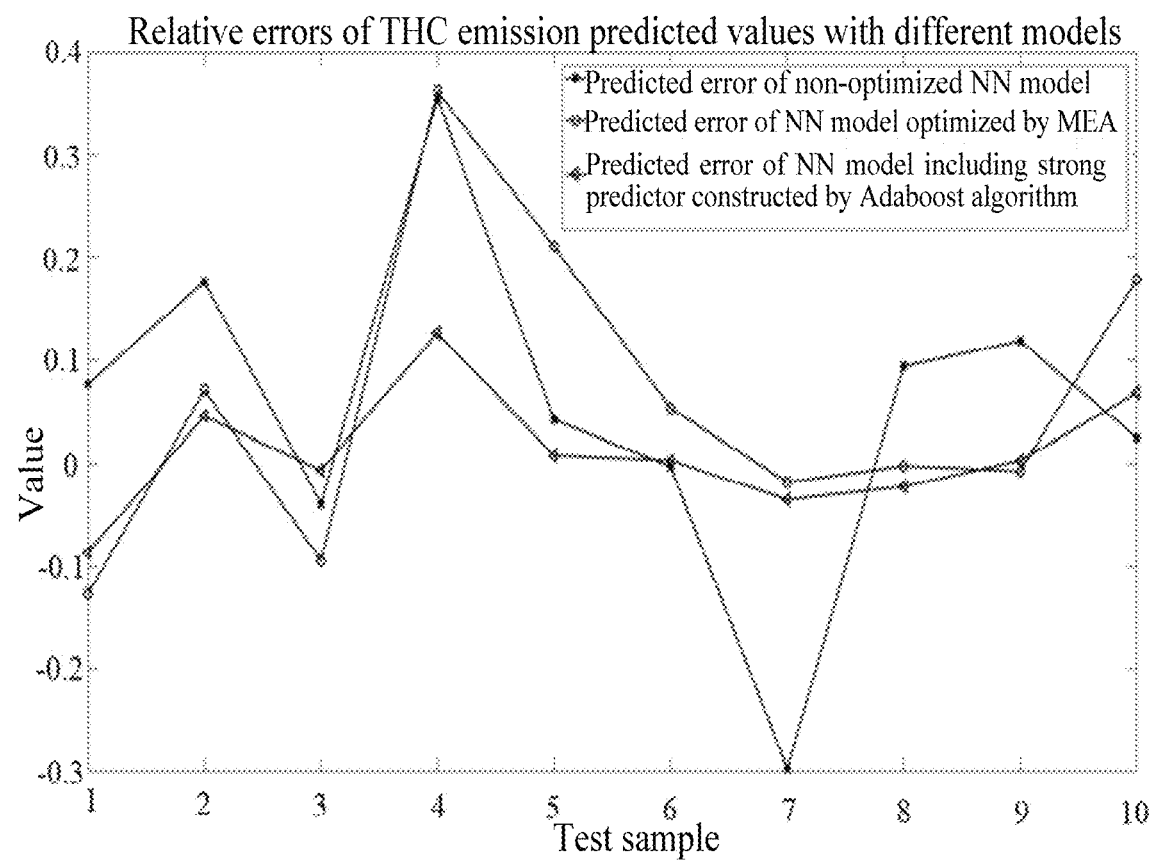
FIG. 8 is a comparison diagram among a real-time prediction method for an engine emission which is implemented by optimizing an initial weight and an initial weight of an NN with an MEA and establishing a strong NN predictor with an Adaboost algorithm, a non-optimized NN, and an NN only having an initial weight and an initial threshold optimized, in terms of a relative error of a THC emission predicted value according to the present disclosure.

4. The comparison diagram among the real-time prediction method for an engine emission provided by the present disclosure, the non-optimized NN and the NN only having the initial weight and threshold optimized in terms of the relative error of the THC emission predicted value is as shown in FIG. 8.

Figure 9:
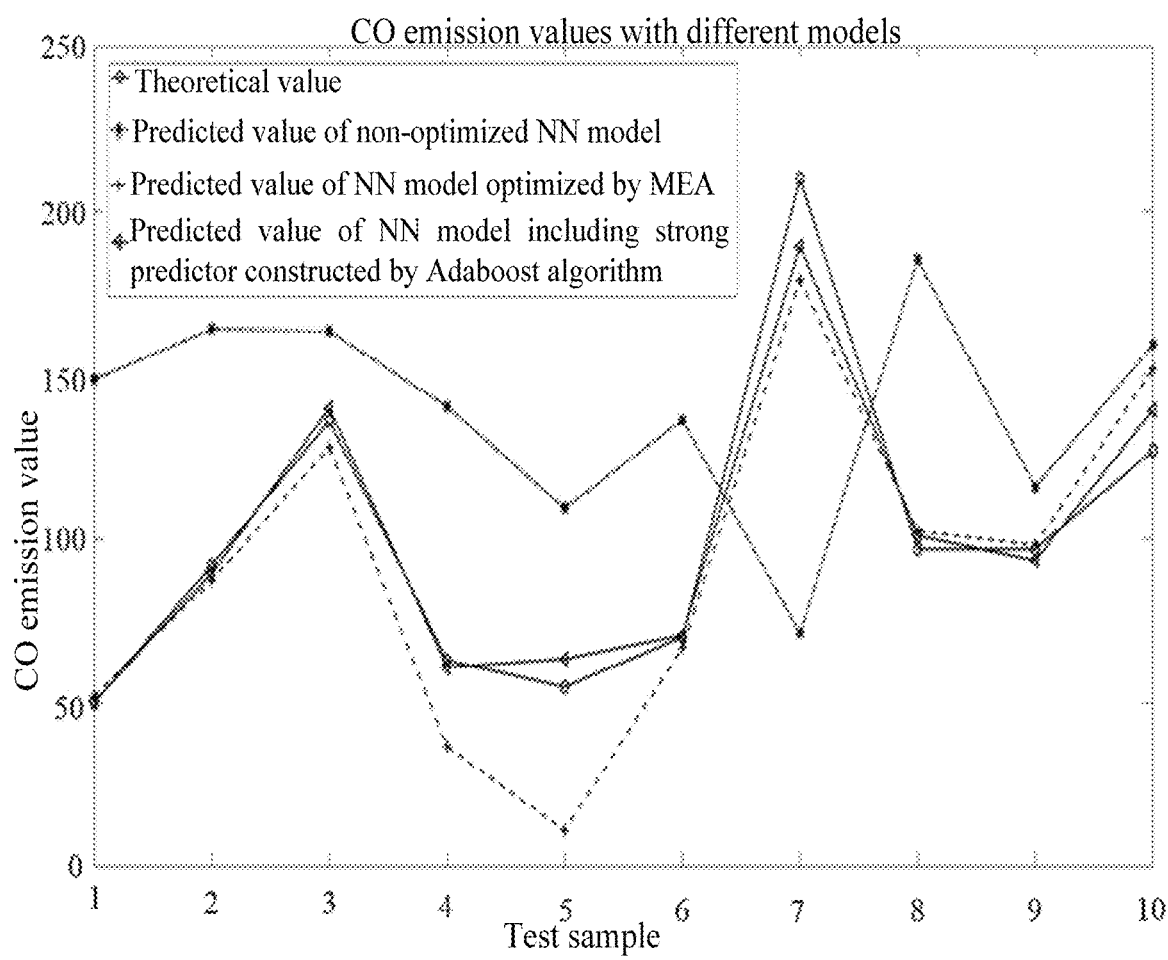
FIG. 9 is a comparison diagram among a real-time prediction method for an engine emission which is implemented by optimizing an initial weight and an initial weight of an NN with an MEA and establishing a strong NN predictor with an Adaboost algorithm, a non-optimized NN, and an NN only having an initial weight and an initial threshold optimized, in terms of a CO emission predicted effect according to the present disclosure.

5. The comparison diagram among the real-time prediction method for an engine emission provided by the present disclosure, the non-optimized NN and the NN only having the initial weight and threshold optimized in terms of the CO emission predicted effect is as shown in FIG. 9.

Figure 10:
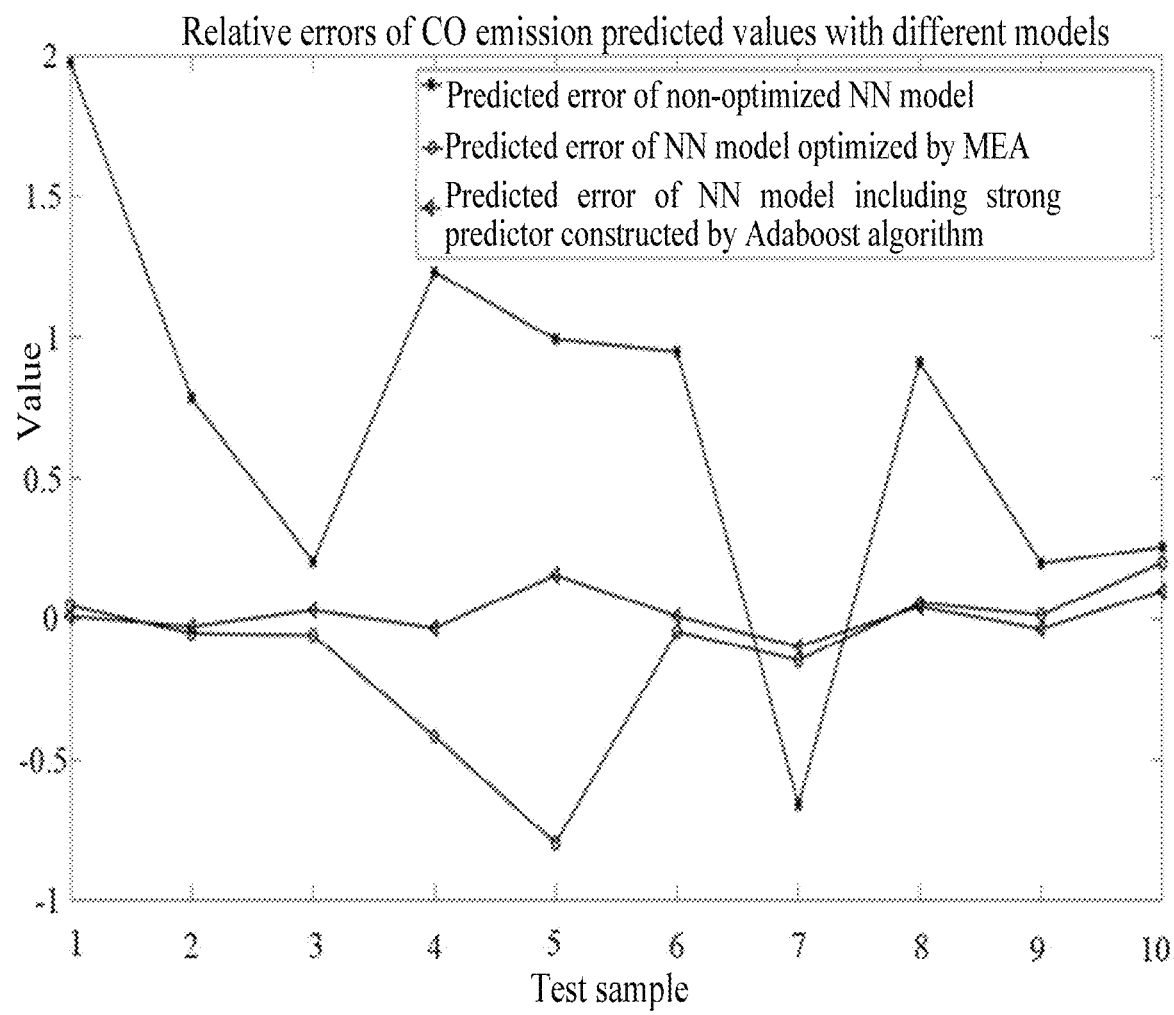
FIG. 10 is a comparison diagram among a real-time prediction method for an engine emission which is implemented by optimizing an initial weight and an initial weight of an NN with an MEA and establishing a strong NN predictor with an Adaboost algorithm, a non-optimized NN, and an NN only having an initial weight and an initial threshold optimized, in terms of a relative error of a CO emission predicted value according to the present disclosure.

6. The comparison diagram among the real-time prediction method for an engine emission provided by the present disclosure, the non-optimized NN and the NN only having the initial weight and threshold optimized in terms of the relative error of the CO emission predicted value is as shown in FIG. 10. The relative error is calculated as follows.

$$error_l^j = (y_l^j - O_l^j)/y_l^j \; l=1,2,\ldots,h; \; j=1,2,\ldots,n \quad (8)$$

where, $error_l^j$ represents a relative error of an lth output of a jth sample, $y_l^i$ represents a theoretical value for the lth output of the jth sample, and represents a predicted value for the lth output of the jth sample.

With the MSE shown in equation (3-16) for evaluating the prediction accuracy of the model, calculation is performed to achieve the following effects.

1. With regard to the prediction accuracy on the NOx emission, MSEs of the predicted NOx emission results of the real-time prediction method for an engine emission provided by the present disclosure, the non-optimized NN, and the NN only having the initial weight and threshold optimized are 952.4699, 112226.2066 and 29886.4149, respectively. Compared with the non-optimized NN, the present disclosure improves the accuracy by about 117.8 times; and compared with the NN only having the initial weight and threshold optimized, the present disclosure improves the accuracy by about 31.3 times.

2. With regard to the prediction accuracy on the THC emission, MSEs of the predicted THC emission results of the real-time prediction method for an engine emission provided by the present disclosure, the non-optimized NN, and the NN only having the initial weight and threshold optimized are 13.4988, 116.1970 and 100.5901, respectively. Compared with the non-optimized NN, the present disclosure improves the accuracy by about 8.6 times; and compared with the NN only having the initial weight and threshold optimized, the present disclosure improves the accuracy by about 7.5 times.

3. With regard to the prediction accuracy on the CO emission, MSEs of the predicted CO emission results of the real-time prediction method for an engine emission provided by the present disclosure, the non-optimized NN, and the NN only having the initial weight and threshold optimized are 71.1940, 5745.1125 and 432.5997, respectively. Compared with the non-optimized NN, the present disclosure improves the accuracy by about 80.7 times; and compared with the NN only having the initial weight and threshold optimized, the present disclosure improves the accuracy by about 6.1 times.

In case of a larger number of samples in the dataset, the present disclosure can obtain a more accurate predicted result to better reflect the actual condition, and thus can be applied to measuring the transient emissions of any engine in various cases.

Although the embodiments of the present disclosure are described, those of ordinary skills in the art may understand that various changes, modifications, replacements and alterations may be made to these embodiments without departing from the principle and spirit of the present disclosure, and shall fall within the protection scope of the present disclosure.

What is claimed is:

1. A real-time prediction method for an engine emission, comprising following steps:
building a real-time prediction device comprising one or more processors and a strong neural network (NN) predictor model, comprising:
step 1: acquiring a plurality of known historical test data samples for engine emission, the historical test data samples each comprising values of evaluation indexes affecting the engine emission and an emission value of an engine in a working condition, wherein the evaluation indexes affecting the engine emission comprises a rotational speed, a torque, a power, a rail pressure, an air-fuel ratio, a fuel consumption, an exhaust gas recirculation (EGR) rate and a start of injection (SOI), and the emission value of the engine in the working condition comprises an nitrogen oxide (NOx) emission value, a total hydro carbon (THC) emission value and a carbon monoxide (CO) emission value;
step 2: randomly dividing the plurality of known historical test data samples into a training set and a test set;
step 3: determining, for each of a plurality of (NN) predictive models, a topological structure comprising a number of input layer nodes, a number of output layer nodes and a number of hidden layer nodes, comprising:
step 31: determining, with values of evaluation indexes affecting the engine emission in the training set for the historical test data samples as an input of each of NNs, and an emission value of the engine in the working condition in the training set for the historical test data samples as an output of each of the NNs, the number of input layer nodes and the number of output layer nodes in the NN according to input and output dimensions, setting a number of hidden layer nodes in each of the plurality of NN predictive models to be different, and training the plurality of NN predictive models;
step 32: obtaining a plurality of trained NN predictive models upon completion of the training on the NN predictive models, and respectively calculating, with values of evaluation index affecting the engine emission in the test set for the historical test data samples as an input of each of the trained NNs, mean square errors (MSEs) between predicted values of the trained NNs and theoretical values; and
step 33: setting a number of hidden layer nodes corresponding to a minimum MSE of the MSEs between the predicted values and the theoretical value of the trained NN predictive models as an optimal number of hidden layer nodes, and setting the number of hidden layer nodes in each of rest trained NN predictive models as the optimal number of hidden layer nodes, to obtain a plurality of identical NN predictive models having identical topological structure;
step 4: optimizing, with a mind evolutionary algorithm (MEA), randomly generated winning subpopulations and temporary subpopulations each containing individuals, to obtain optimal initial weights and optimal initial thresholds for each of the plurality of identical NN predictive models, wherein each individual is decoded to obtain initial weights and initial thresholds for each of the plurality of identical NN predictive models; and
step 5: training, with the optimal initial weights and the optimal initial thresholds obtained with the MEA as the initial weights and the initial thresholds for each of the plurality of identical NN predictive models, each of the identical NN predictive models with the training set for the historical test data samples through an Adaboost algorithm, to obtain a plurality of weak NN predictors, and combining the plurality of weak NN predictors into the strong NN predictor model; and
receiving, by the real-time prediction device, values of evaluation indexes affecting the engine emission which are measured in real time on the engine, loading the values to the strong NN predictor model, and outputting, by the real-time prediction device, a real-time predicted result for the engine emission in real time, wherein the real-time predicted result comprises a real-time NOx emission value, a real-time THC emission value, and a real-time CO emission value.

2. The real-time prediction method for the engine emission according to claim 1, wherein the training in step 31 of step 3 specifically comprises:
step 301: performing min-max normalization on an input k and an output 1 of each sample i in the training set for the historical test data samples according to equations:

$$x_k^i = \frac{x_k^i - x_{k\,min}}{x_{k\,max} - x_{k\,min}} \quad (3\text{-}1)$$

$$i = 1, 2, \ldots, m; k = 1, 2, \ldots, p$$

$$y_l^i = \frac{y_l^i - y_{l\,min}}{y_{l\,max} - y_{l\,min}} \quad (3\text{-}2)$$

$$i = 1, 2, \ldots, m; l = 1, 2, \ldots, h$$

wherein, m represents a total number of samples in the training set, p represents the number of input layer nodes, h represents the number of output layer nodes, $x_k^i$ represents a kth input of an ith sample in the training set, $x_{kmax}$ represents a maximum value among kth inputs of all samples in the training set, $x_{kmin}$ represents a minimum value among the kth inputs of all samples in the training set, $y_l^i$ represents an lth output for the ith sample in the training set, $y_{l\,max}$ represents a maximum value among lth outputs in all samples in the training set, and $y_{l\,min}$ represents a minimum value among the lth outputs in all samples in the training set;
step 302: initializing a connection weight $w_{ks}$ between a kth input layer neuron and an sth hidden layer neuron, a threshold $a_s$ of the sth hidden layer neuron, a connection weight $w_{sl}$ between the sth hidden layer neuron and an lth output layer neuron, and a threshold $b_l$ of the lth output layer neuron;
step 303: calculating an output $H_s^i$ from a hidden layer for each sample i in the training set according to an equation:

$$H_s^i = f\left(\sum_{k=1}^{p} x_k^i w_{ks} + a_s\right) \quad (3\text{-}3)$$

$i = 1, 2, \ldots, m; s = 1, 2, \ldots, g$ wherein, $H_s^i$ represents an output from an sth hidden layer neuron for the ith sample, g is the number of hidden layer nodes, and f is an activation function for the hidden layer neuron and adopts a single-curve tangent sigmoid function expressed as:

$$f(t) = \frac{1}{1 + e^{-t}} \quad (3\text{-}4)$$

step 304: calculating an output $O_l^i$ from an output layer for each sample i in the training set according to an equation:

$$O_l^i = M\left(\sum_{s=1}^{g} H_s^i w_{sl} + b_l\right) \quad (3\text{-}5)$$

$i = 1, 2, \ldots, m; l = 1, 2, \ldots, h$ wherein, $O_l^i$ represents an output from an lth output layer neuron for the ith sample, and M is an activation function for the output layer neuron and is a linear function expressed as:

$$M(t) = t \quad (3\text{-}6)$$

step 305: calculating an output error of the NN according to an equation:

$$E = \frac{1}{2}\sum_{i=1}^{m}\sum_{l=1}^{h}(y_l^i - O_l^i)^2 \quad (3\text{-}7)$$

step 306: updating, with a gradient descent method, the connection weight $w_{ks}$ between the kth input layer neuron and the sth hidden layer neuron, and the connection weight $w_{sl}$ between the sth hidden layer neuron and the lth output layer neuron, comprising:

expressing a variation $\Delta w_{ks}$ for the connection weight between the kth input layer neuron and the sth hidden layer neuron as:

$$\Delta w_{ks} = -\eta \frac{\partial E}{\partial w_{ks}} = \eta \sum_{i=1}^{m} x_k^i H_s^i (1 - H_s^i) \sum_{l=1}^{h} w_{sl}(y_l^i - O_l^i) \quad (3\text{-}8)$$

$k = 1, 2, \ldots, p; s = 1, 2, \ldots, g$ wherein, $\eta$ is a preset learning rate;

obtaining an updated connection weight $w_{ks}$ between the kth input layer neuron and the sth hidden layer neuron as:

$w_{ks} = w_{ks} + \Delta w_{ks}\ k=1,2,\ldots,p;\ s=1,2,\ldots,g$ \quad (3-9)

expressing a variation $\Delta w_{sl}$ for the connection weight between the sth hidden layer neuron and the lth output layer neuron as:

$$\Delta w_{sl} = -\eta \frac{\partial E}{\partial w_{sl}} = \eta \sum_{i=1}^{m} H_s^i (y_l^i - O_l^i) \quad (3\text{-}10)$$

$s = 1, 2, \ldots, g; l = 1, 2, \ldots, h$ obtaining an updated connection weight $w_{sl}$ between the sth hidden layer neuron and the lth output layer neuron as:

$w_{sl} = w_{sl} + \Delta w_{sl}\ s=1,2,\ldots,g;\ l=1,2,\ldots,h$ \quad (3-11)

step 307: updating, with the gradient descent method, the threshold as of the sth hidden layer neuron and the threshold $b_l$ of the lth output layer neuron, comprising:

expressing a variation $\Delta a_s$ for the threshold of the sth hidden layer neuron, as:

$$\Delta a_s = -\eta \frac{\partial E}{\partial a_s} = \eta \sum_{i=1}^{m} H_s^i (1 - H_s^i) \sum_{l=1}^{h} w_{sl}(y_l^i - O_l^i) \quad (3\text{-}12)$$

$S = 1, 2, \ldots, g$ obtaining an updated threshold as of the sth hidden layer neuron as:

$a_s = a_s + \Delta a_s\ s=1,2,\ldots,g$ \quad (3-13)

expressing a variation $\Delta b_l$ for the threshold of the lth output layer neuron as:

$$\Delta b_l = -\eta \frac{\partial E}{\partial b_l} = \eta \sum_{i=1}^{m}(y_l^i - O_l^i) \quad (3\text{-}14)$$

$l = 1, 2, \ldots, h$ obtaining an updated threshold $b_l$ of the lth output layer neuron:

$b_l = b_l + \Delta b_l\ l=1,2,\ldots,h$ \quad (3-15).

3. The real-time prediction method for the engine emission according to claim 2, wherein step 4 comprises:

step 401: setting operating parameters of the MEA with Matlab software, wherein the operating parameters comprise the topological structure, an encoding mode, a number of iterations, a population size, winning subpopulations and temporary subpopulations of each of the identical NN predictive models; and an individual encoding mode is real number encoding, and an encoding length t is expressed as:

$t = pg + gh + g + h$ \quad (4-1)

wherein, p is a number of input layer nodes in each of the identical NN predictive models, g is a number of hidden layer nodes in each of the identical NN predictive models, h is a number of output layer nodes in each of the identical NN predictive models;

step 402: randomly generating the winning subpopulations and the temporary subpopulations, performing a convergence operation on each of the winning subpopulations and the temporary subpopulations until the winning subpopulations and the temporary subpopulations are mature, and setting an optimal individual in each of the winning subpopulations and the temporary subpopulations as a score of the subpopulation, comprises:

step 4021: defining a score function for individuals in each of the winning subpopulations and the temporary subpopulations, comprising:

decoding each individual in the winning subpopulations and the temporary subpopulations to obtain an NN connection weight matrix and an NN threshold matrix corresponding to each individual, comprising:

transforming a first element to a (p*g)th element of the individual in each of the subpopulations into a first connection weight matrix $w_{p \times g}$ according to a column order, such that a first column is stored fully first and then other columns are fully stored in sequence, each element in the first connection weight matrix being consistent with the connection weight $w_{ks}$ from the input layer neuron to the hidden layer neuron in step 3; transforming a (p*g+1)th element to a (p*g+g*h)th element of the individual into a second connection weight matrix $w_{g \times h}$ according to the column order, each element in the second connection weight matrix being consistent with the connection weight $w_{sl}$ from the hidden layer neuron to the output layer neuron in step 3; transforming a (p*g+g*h+1)th element to a (p*g+g*h+g)th element of the individual into a first threshold matrix $w_{g \times 1}$ according to the column order, each element in the first threshold matrix being consistent with the threshold $a_s$ of the hidden layer neuron in step 3; and transforming a (p*g+g*h+g+1)th element to a (p*g+g*h+g+h)th element into a second threshold matrix $w_{h \times 1}$ according to the column order, each element in the second threshold matrix being consistent with the threshold $b_l$ of the output layer neuron in step 3; and setting, upon completion of the decoding, the values of evaluation indexes affecting the engine emission in the training set for the historical test data samples as the input of each of the identical NN predictive models, and the emission value of the engine in the working condition in the training set for the historical test data samples as the output of each of the identical NN predictive models, calculating an output of each of the identical NN predictive models according to equations (3-1)-(3-6), and an MSE output from each of the identical NN predictive models according to equation $$MSE = \frac{1}{m}\sum_{i=1}^{m}\sum_{l=1}^{h}(y_l'^i - O_l''^i)^2,$$

and setting a reciprocal of the MSE as a score val of the individual according to an equation:

$$val = \frac{1}{MSE} \quad (4\text{-}2)$$

wherein, m is the total number of samples in the training set, h represents the number of output layer nodes, $y_l'^i$ is a theoretical value of the lth output for the ith sample in the training set before normalization, and $\theta''^i_l$ is a predicted value of the lth output $O_l^i$ calculated according to equations (3-1)-(3-6) for the ith sample in the training set after reverse normalization, the reverse normalization being expressed as:

$\theta''^i_l = O_l^i \times (y_{lmax} - y_{lmin}) + y_{lmin}$ i=1,2, ... ,n; l=1,2, ... ,h wherein, $y_{lmax}$ represents the maximum value among the lth outputs of all samples in the training set, and $y_{lmin}$ represents the minimum value among the lth outputs of all samples in the training set;

step 4022: randomly generating q+z individuals within a global range, wherein q is a number of winning subpopulations, and z is a number of temporary subpopulations; calculating scores of the individuals according to equation (4-2), sequentially setting front q individuals as centers of the q winning subpopulations and rear z individuals as centers of the z temporary subpopulations according to a descending order for the scores of the individuals, and generating new individuals according to a normal distribution rule based on a center of each of the winning subpopulations and the temporary subpopulations to form initial winning subpopulations and initial temporary subpopulations; and step 4023: performing a convergence operation on each of the initial winning subpopulations and the initial temporary subpopulations, comprising: respectively calculating scores of all individuals in each of the initial winning subpopulations and the initial temporary subpopulations; determining whether the initial winning subpopulations or the initial temporary subpopulations comprise an individual having a score greater than a score of the center of a corresponding subpopulation; generating, with the individual as a new center of the corresponding subpopulation, new individuals based on the new center according to the normal distribution rule to form a new subpopulation, when it is determined that the initial winning subpopulations or the initial temporary subpopulations comprise the individual; repeating the determining and the generating, until an individual having a score greater than the score of the center of the subpopulation no longer exists in the initial winning subpopulations or the initial temporary subpopulations, in which the initial winning subpopulations and the initial temporary subpopulations are mature, the convergence operation is ended; and setting a score at the new center of the new subpopulation as a score of the new subpopulation;

step 403: performing a mutation operation between the winning subpopulations and the temporary subpopulations upon completion of the convergence operation, and executing step 404, wherein the mutation operation between the winning subpopulations and the temporary subpopulations comprises: replacing, if a temporary subpopulation has a score greater than a score of a winning subpopulation, the winning subpopulation with the won temporary subpopulation to form a new winning subpopulation, releasing individuals in the original winning subpopulation, and performing a global research again to form a new temporary subpopulation to supplement the number of temporary subpopulations; releasing, if a temporary subpopulation has a score less than a score of any winning subpopulation, individuals in the temporary subpopulation, and performing the global search again to form a new temporary subpopulation; and not performing any operation if a temporary subpopulation has a score same as a score of any winning subpopulation; and step 404: performing, according to method in 4023, the convergence operation on a new temporary subpopulation and a new winning subpopulation obtained in step 403, repeating step 403 the number of iterations, calculating a globally optimal individual, and decoding the individual to obtain the optimal initial weights and the optimal initial thresholds for each of the identical NN predictive models.

4. The real-time prediction method for the engine emission according to claim 1, wherein step 5 comprises:

step 501: initializing a distribution weight of each sample i in a training set of each of the weak NN predictors according to an equation:

$$D_t(i)=1/m \quad t=1,2,\ldots,v; \; i=1,2,\ldots,m \quad (5\text{-}1)$$

wherein, v is a total number of the weak NN predictors, and m is a total number of samples in the training set;

step 502: training a tth weak NN predictor according to the NN training step in step 3, and calculating an output error $e_t^i$ for each sample i in the training set according to an equation:

$$e_t^i = \sum_{l=1}^{h} (y_{tl}^i - O_{tl}^i) t = 1, 2, \ldots v; i = 1, 2, \ldots, m \quad (5\text{-}2)$$

wherein, $y_{tl}^i$ represents a theoretical value of an lth output for an ith sample of the tth weak NN predictor, $O_{tl}^i$ represents a predicted value of the lth output for the ith sample of the tth weak NN predictor, and h represents a total number of output variables;

step 503: updating a distribution weight of each sample i in a training set of a (t+1)th weak NN predictor: updating the distribution weight of each sample in the training set of the (t+1)th weak NN predictor according to equation (5-3) when an output error $e_t^i$ of each sample i in the training set of the tth weak NN predictor is greater than a preset threshold c; and keeping the distribution weight of the sample unchanged when the output error $e_t^i$ of each sample i in the training set of the tth weak NN predictor is less than or equal to the preset threshold c, and normalizing the distribution weight of each sample i according to equation (5-4);

$$D_{t+1}(i) = 1.2 * D_t(i) \quad (5\text{-}3)$$

$$D_{t+1}(i) = D_{t+1}(i)/\sum_{i=1}^{m} D_{t+1}(i) \quad (5\text{-}4)$$

step 504: calculating a distribution weight $a_t$ of the tth weak NN predictor according to an equation:

$$a_t = \frac{1}{2}\ln\left(\frac{1-e_t}{e_t}\right) T = 1, 2, \ldots, v \quad (5\text{-}5)$$

wherein, v is the total number of the weak NN predictors, $$e_t = \sum_{i=1}^{m} B_t(i), \text{ and } B_t(i) = \begin{cases} D_t(i), \text{ when} e_t^i > c \\ 0, \text{ when} e_t^i \le c \end{cases};$$

step 505: repeating steps 502-504 until t weak NN predictors are completely trained; and step 506: establishing the strong NN predictor, comprising: normalizing the distribution weight of each of the weak NN predictors according to equation (5-6), and combining the weak NN predictors according to equation (5-7) to form the strong NN predictor model:

$$a_t = a_t / \sum_{t=1}^{v} a_t \quad (5\text{-}6)$$

$$output_j = \sum_{t=1}^{v} a_t Y_t^j \quad (5\text{-}7)$$

wherein, $a_t$ is the distribution weight of the tth weak NN predictor, $output_j$ represents a predicted output of the strong NN predictor for a jth sample in a dataset to be predicted, $Y_t^i$ represents a predicted output of a tth trained weak NN predictor for the jth sample in the dataset to be predicted, j=1, 2, . . . , n, and n is a total number of samples in the dataset to be predicted.

5. The real-time prediction method for the engine emission according to claim 2, wherein step 5 comprises:

step 501: initializing a distribution weight of each sample i in a training set of each of the weak NN predictors according to an equation:

$$D_t(i)=1/m \quad t=1,2,\ldots,v; \; i=1,2,\ldots,m \quad (5\text{-}1)$$

wherein, v is a total number of the weak NN predictors, and m is a total number of samples in the training set;

step 502: training a tth weak NN predictor according to the NN training step in step 3, and calculating an output error $e_t^i$ for each sample i in the training set according to an equation:

$$e_t^i = \sum_{l=1}^{h} (y_{tl}^i - O_{tl}^i) t = 1, 2, \ldots v; i = 1, 2, \ldots, m \quad (5\text{-}2)$$

wherein, $y_{tl}^i$ represents a theoretical value of an lth output for an ith sample of the tth weak NN predictor, $O_{tl}^i$ represents a predicted value of the lth output for the ith sample of the tth weak NN predictor, and h represents a total number of output variables;

step 503: updating a distribution weight of each sample i in a training set of a (t+1)th weak NN predictor: updating the distribution weight of each sample in the training set of the (t+1)th weak NN predictor according to equation (5-3) when an output error $e_t^i$ of each sample i in the training set of the tth weak NN predictor is greater than a preset threshold c; and keeping the distribution weight of the sample unchanged when the output error $e_t^i$ of each sample i in the training set of the tth weak NN predictor is less than or equal to the preset threshold c, and normalizing the distribution weight of each sample i according to equation (5-4);

$$D_{t+1}(i) = 1.2 * D_t(i) \quad (5\text{-}3)$$

$$D_{t+1}(i) = D_{t+1}(i)/\sum_{i=1}^{m} D_{t+1}(i) \quad (5\text{-}4)$$

step 504: calculating a distribution weight $a_t$ of the tth weak NN predictor according to an equation:

$$a_t = \frac{1}{2}\ln\left(\frac{1-e_t}{e_t}\right) T = 1, 2, \ldots, v \tag{5-5}$$

wherein, v is the total number of the weak NN predictors $$e_t = \sum_{i=1}^{m} B_t(i), \text{ and } B_t(i) = \begin{cases} D_t(i), \text{ when } e_t^j > c \\ 0, \text{ when } e_t^j \le c \end{cases};$$

step 505: repeating steps 502-504 until t weak NN predictors are completely trained; and step 506: establishing the strong NN predictor, comprising: normalizing the distribution weight of each of the weak NN predictors according to equation (5-6), and combining the weak NN predictors according to equation (5-7) to form the strong NN predictor model:

$$a_t = a_t / \sum_{t=1}^{v} a_t \tag{5-6}$$

$$output_j = \sum_{t=1}^{v} a_t Y_t^j \tag{5-7}$$

wherein, $a_t$ is the distribution weight of the tth weak NN predictor, $output_j$ represents a predicted output of the strong NN predictor for a jth sample in a dataset to be predicted, $Y_t^j$ represents a predicted output of a tth trained weak NN predictor for the jth sample in the dataset to be predicted, j=1, 2, ..., n, and n is a total number of samples in the dataset to be predicted.

6. The real-time prediction method for the engine emission according to claim 3, wherein step 5 comprises:

step 501: initializing a distribution weight of each sample i in a training set of each of the weak NN predictors according to an equation:

$$D_t(i) = 1/m \quad t=1,2,\ldots,v; \; i=1,2,\ldots,m \tag{5-1}$$

wherein, v is a total number of the weak NN predictors, and m is a total number of samples in the training set;

step 502: training a tth weak NN predictor according to the NN training step in step 3, and calculating an output error $e_t^i$ for each sample i in the training set according to an equation:

$$e_t^i = \sum_{l=1}^{h}(y_{tl}^i - O_{tl}^i) t = 1, 2, \ldots v; i = 1, 2, \ldots, m \tag{5-2}$$

wherein, $y_{tl}^i$ represents a theoretical value of an lth output for an ith sample of the tth weak NN predictor, $O_{tl}^i$ represents a predicted value of the lth output for the ith sample of the tth weak NN predictor, and h represents a total number of output variables;

step 503: updating a distribution weight of each sample i in a training set of a (t+1)th weak NN predictor: updating the distribution weight of each sample in the training set of the (t+1)th weak NN predictor according to equation (5-3) when an output error $e_t^i$ of each sample i in the training set of the tth weak NN predictor is greater than a preset threshold c; and keeping the distribution weight of the sample unchanged when the output error $e_t^i$ of each sample i in the training set of the tth weak NN predictor is less than or equal to the preset threshold c, and normalizing the distribution weight of each sample i according to equation (5-4);

$$D_{t+1}(i) = 1.2 * D_t(i) \tag{5-3}$$

$$D_{t+1}(i) = D_{t+1}(i) / \sum_{i=1}^{m} D_{t+1}(i) \tag{5-4}$$

step 504: calculating a distribution weight $a_t$ of the tth weak NN predictor according to an equation:

$$a_t = \frac{1}{2}\ln\left(\frac{1-e_t}{e_t}\right) T = 1, 2, \ldots, v \tag{5-5}$$

wherein, v is the total number of the weak NN predictors, $$e_t = \sum_{i=1}^{m} B_t(i), \text{ and } B_t(i) = \begin{cases} D_t(i), \text{ when } e_t^j > c \\ 0, \text{ when } e_t^j \le c \end{cases};$$

step 505: repeating steps 502-504 until t weak NN predictors are completely trained; and step 506: establishing the strong NN predictor, comprising: normalizing the distribution weight of each of the weak NN predictors according to equation (5-6), and combining the weak NN predictors according to equation (5-7) to form the strong NN predictor model:

$$a_t = a_t / \sum_{t=1}^{v} a_t \tag{5-6}$$

$$output_j = \sum_{t=1}^{v} a_t Y_t^j \tag{5-7}$$

wherein, $a_t$ is the distribution weight of the tth weak NN predictor, $output_j$ represents a predicted output of the strong NN predictor for a jth sample in a dataset to be predicted, $Y_t^j$ represents a predicted output of a tth trained weak NN predictor for the jth sample in the dataset to be predicted, j=1, 2, ..., n, and n is a total number of samples in the dataset to be predicted.

* * * * *